United States Patent

[11] 3,558,942

| [72] | Inventors | Roger Gettys Hill<br>Racine;<br>Arthur J. Beutler, Greendale, Wis. |
|---|---|---|
| [21] | Appl. No. | 834,621 |
| [22] | Filed | June 17, 1969 |
| [45] | Patented | Jan. 26, 1971 |
| [73] | Assignee | Gettys Manufacturing Company, Inc.<br>Racine, Wis.<br>a corporation of Wisconsin |

[54] DYNAMOELECTRIC MACHINE WITH IMPROVED COOLING MEANS
5 Claims, 3 Drawing Figs.

[52] U.S. Cl. .................................................... 310/54,
310/57, 310/61
[51] Int. Cl. ............................................. H02k 9/10
[50] Field of Search .......................................... 310/58, 57,
61, 54, 59, 63, 53, 54, 154, 218, 269, 68.3, 68, 88,
86, 89; 310/61

[56] References Cited
UNITED STATES PATENTS

| 3,249,775 | 5/1966 | Baylac | 310/61X |
|---|---|---|---|
| 3,007,065 | 10/1961 | Rigney | 310/54 |
| 2,780,737 | 2/1957 | Labastie et al. | 310/61X |
| 3,244,917 | 4/1966 | Gute | 310/154 |
| 2,462,649 | 2/1949 | Lange | 310/57 |
| 3,056,055 | 9/1962 | Willyoung et al. | 310/61 |
| 2,951,954 | 9/1960 | Willyoung | 310/61 |
| 3,261,172 | 7/1966 | Grant | 310/54X |
| 3,294,991 | 12/1966 | Ward et al. | 310/54 |
| 3,439,203 | 4/1969 | Koizumi | 310/61X |

*Primary Examiner*—Milton O. Hirshfield
*Assistant Examiner*—B. A. Reynolds
*Attorney*—Darby & Darby ABSTRACT: A motor having improved cooling means wherein compressed air is forced through circumferentially arrayed ducts within the rotor whenever cooling is required. The fluid passage system is such that the critical portions of the motor can be effectively sealed from the air ducts to prevent contamination. Additionally, the entire stator construction is sealed from its environment so that in the event of internal leakage, the back pressure provided by the sealed stator minimizes the likelihood of damage to the motor from the air coolant.

INVENTORS
ROGER GETTYS HILL
ARTHUR J. BEUTLER

BY Darby & Darby
ATTORNEYS

INVENTORS
ROGER GETTYS HILL
ARTHUR J. BEUTLER

BY Darby & Darby

ATTORNEYS

DYNAMOELECTRIC MACHINE WITH IMPROVED COOLING MEANS

This invention relates to dynamoelectric machines and, especially, to servo drive motors of the type used with machine tools.

The requirements of a motor used as a positional servo in a machine tool system, such as a profiling (i.e. contouring) system, differ substantially from those of motors which are used to drive loads at a relatively steady speed. Positional servos rarely are operated at a steady speed and, generally, full speed is used only for rapid transit where the torque required is merely that necessary to overcome friction. However, maximum torque is often required at zero speed and possibly up to 50 percent of maximum speed.

Because of this low speed, high-torque requirement, servomotors cannot rely upon the movement of the rotor to aid in the circulation of cooling air. Moreover, because the servomotor may be operating at low speeds, near zero, the efficiency of the motor is reduced substantially as compared with standard motors. Thus, not only is the dissipation of heat poorer than usual, but, also, the losses in the form of heat are greater than usual.

Conventionally, the solution of this dilemma has been achieved by using an oversize motor or by using an auxiliary blower for cooling purposes. Obviously, it is a disadvantage to use a 2 HP motor (for example) to do the job of a ¼ HP motor, while the use of an auxiliary blower adds to the risk of servo failure by contamination of the motor due to foreign particles within the airstream. An added inconvenience of such blowers is their high noise level, which is magnified inasmuch as the auxiliary cooling means is generally run continually to ensure suitable cooling during those periods in which cooling is required. Moreover, since servomotors generally do not require continuous cooling (for example, cooling may be required for only a few hours during a week's use of the motor), the prior art solutions to the foregoing problems are also costlier than necessary.

The present invention overcomes the prior art drawbacks by providing an auxiliary cooling means for the motor wherein a fluid coolant is caused to flow through the rotor with sealing means protecting the critical portions of the motor (such as the air gap and commutator assembly) from leakage. The casing of the motor is also sealed so that even if an interior leak should develop, the back pressure caused by the sealed stator will cause the coolant to maintain a desired flow path, thus avoiding the critical portions of the motor.

The invention is described in detail below with reference to the attached drawings, wherein.

Figure 1:
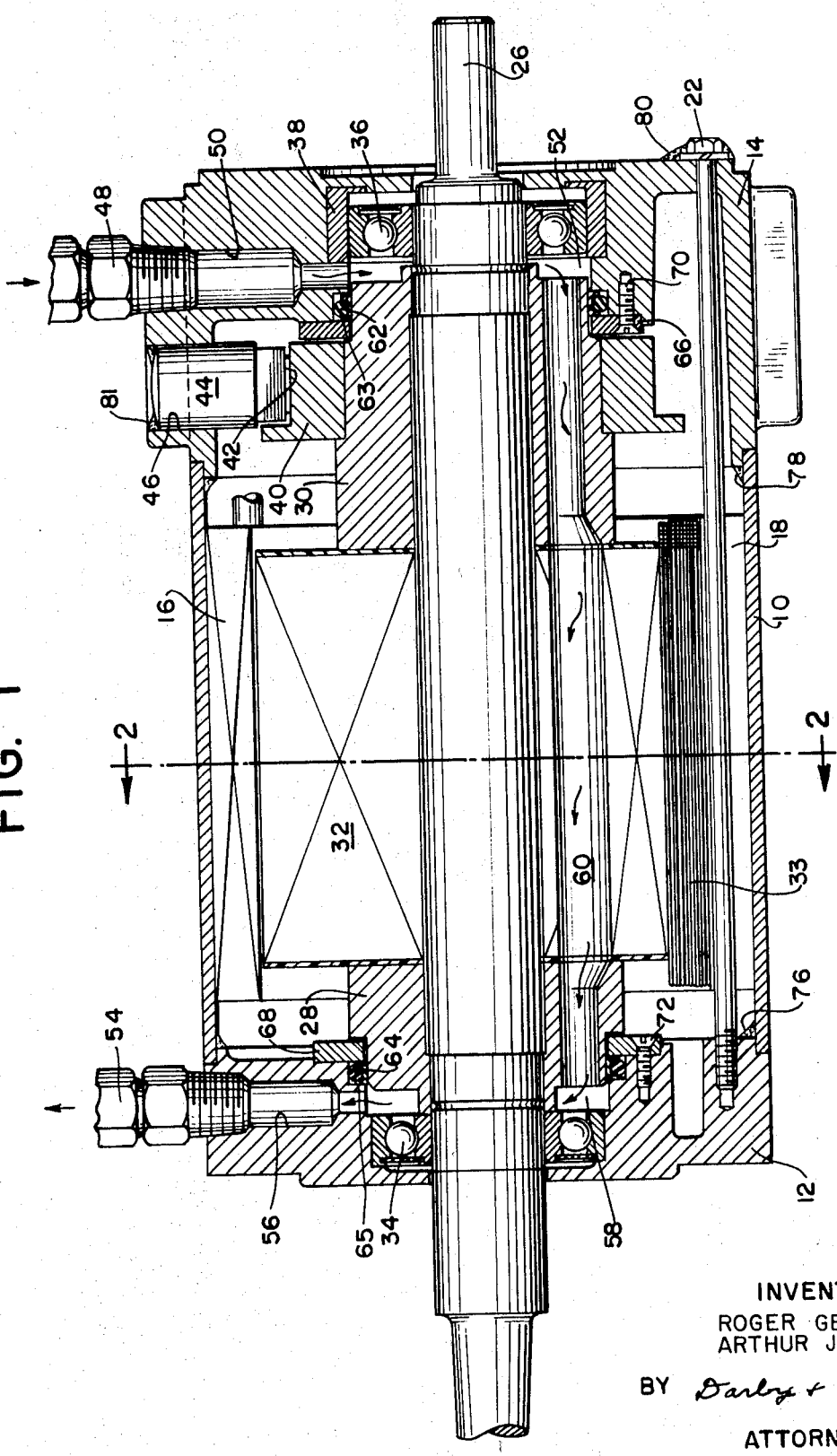
FIG. 1 is a side-sectional view of a preferred embodiment of the invention.
Figure 2:
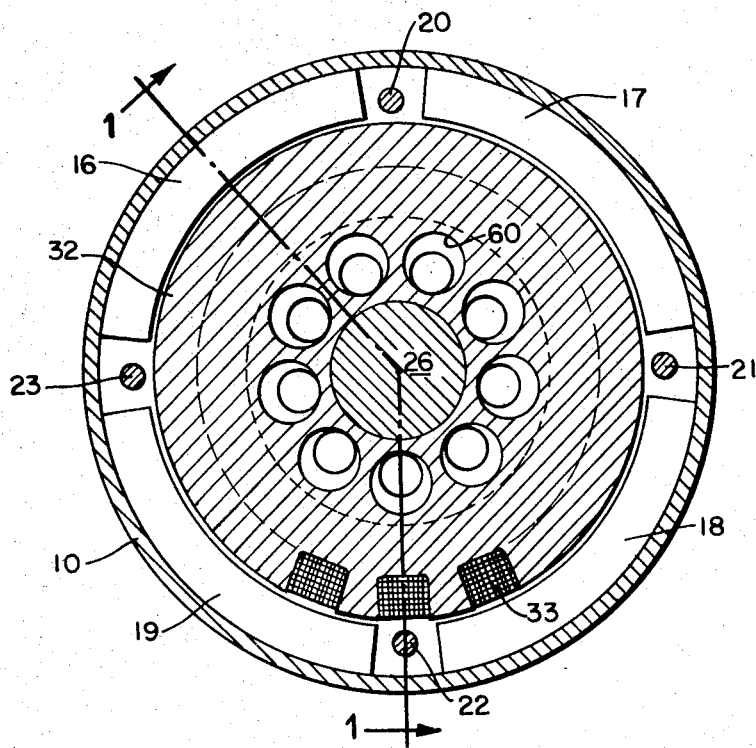
FIG. 2 is a cross-sectional view along the line 2-2 of FIG. 1.

The motor illustrated in FIGS. 1 and 2 has been simplified in some respects to facilitate an understanding of the device. Thus, for the most part, common fastening means and electrical windings and/or connections have not been illustrated since such features per se form no part of the present invention. In fact, the electrical operation of the motor is pursuant to conventional practice except to the extent it relates to the cooling means as described below.

The stator of the motor includes a cylindrical casing 10 having left and right end bells 12 and 14, respectively, secured thereto. Four permanent magnets 16, 17, 18 and 19 are arrayed around the inner periphery of the casing 10, with the stator construction being secured together by four bolts 20, 21, 22 and 23 arranged between the respective permanent magnets as shown in FIG. 2. As an alternative preferred embodiment, it is also proposed to use eight stator magnets.

The armature includes a driving (and braking) shaft 26 which is axially disposed within the stator. Left and right nonmagnetic (e.g. aluminum) collars 28 and 30 are disposed at opposite ends of a central magnetic winding core 32 around which the armature coil 33 is wound. As an example, the armature winding 33 may be a bifilar wave winding. Collars 28 and 30 and the winding core 32 may be press-fit onto the driving shaft 26. The driving shaft rotates in conventional sealed ball bearings 34 and 36 disposed in opposite ends of the stator with the right-hand ball bearing 36 being seated in a steel insert 38 within end bell 14. The ball bearings 34 and 36 are disposed outside of collars 28 and 30, respectively, for purposes which are explained below.

The armature further includes a commutator 40 secured to the right-hand collar 30 and adapted to be contacted by a brush 42 mounted in a brush holder 44 which extends through an opening 46 within right-hand end bell 14. The parts as so far described cooperate in a known fashion when direct current is passed through winding 33 to produce opposing magnetic fields which cause rotation of the armature and thus the driving shaft 26 which is coupled (possibly through suitable gearing means) to the member to be driven.

According to the invention, right-hand end bell 14 is provided with an inlet fluid fitting 48 which is threadedly received within the extremity of a radial duct 50 which terminates in a circumferential passageway 52 formed in the end bell 14 outside the right-hand armature collar 30 but inside the ball bearing 36. The end bell 12 includes an outlet fluid fitting 54 threadedly received in a radial duct 56 which terminates in a circumferential outlet fluid passageway 58 formed between the armature collar 28 and the ball bearing 34. Nine longitudinal ducts 60 (parallel to the axis of shaft 26) are circumferentially arrayed around the shaft 26 and extend through the collar 28, core 32 and collar 30 to provide nine fluid passageways between the inlet circumferential passageway 52 and the outlet fluid passageway 58. A first sealing means including O-rings 62 and 64 within respective polytetrafluoroethylene seats 63 and 65 prevents air within passageways 52 and 58 from reaching the critical parts of the motor such as the air gap between the armature core 32 and the permanent magnets, commutator 40, brushes 42, and, to some extent, the permanent magnets (at least as to ferrous particles). These annular seals 62 and 64 may be held in place by retaining rings 66 and 68, respectively, secured to their associated end bells 14 and 12 by a sufficient number of screws 70 and 72, respectively. Seals 62 and 64 may be made of filled Teflon or any other low-friction, sealing material capable of withstanding the high temperatures encountered.

In addition to the first sealing means, the interior portion of the stator construction between the inlet and outlet passageways 52 and 58 is carefully sealed by a second sealing means which is provided in the preferred embodiment by close tolerances between casing 10 and end bells 12 and 14 held in compression by bolts 22. If sealed bearings 34 and 36 are used, no further sealing is required at the ends of the driving shaft 26. If necessary, supplemental seals of a nonhardening material (for ease of disassembly) such as conventional room temperature vulcanizing silicone may also be used.

With the construction described, in the event of leakage through the seals 62 and 64, there will be no tendency for air to enter the critical portions of the motor because of the back pressure developed by the sealed stator construction. As a result, the air, tending to take the path of least resistance, will flow from the inlet circumferential passageway 52 through ducts 60 to the outlet passageway 58. Moreover, with bearings 34 and 36 positioned outside the respective passageways 58 and 52, should a leak develop in either of the bearings there will still be no tendency for the coolant to flow into the critical areas of the motor.

Figure 3:
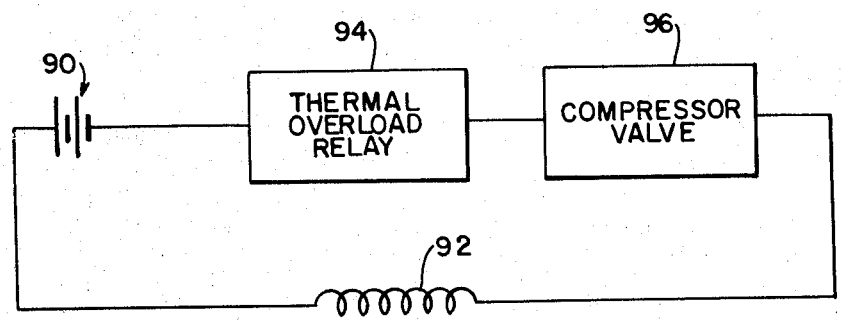
FIG. 3 is a block diagram of the control means used to monitor the airflow through the rotor.

FIG. 3 is a block diagram of the electrical energizing circuit for the coolant supply means. The DC source for the armature is shown as a battery 90 (although in practice such source will include a transformer and full-wave rectifier) and the armature coil is shown at 92. A thermal overload relay 94 is shown connected in series with battery 90, armature 92 and a compressor valve 96 which, when energized, will cause a compressor (not shown) to supply air to the inlet fitting 48 illustrated in FIG. 1.

The thermal overload relay 94 is a commercially available device which may be purchased from the Allen Bradley Company. Essentially, it consists of a resistive coil around a solder pot, with the resistive coil being in series with the armature. When the armature current increases (causing a rise in temperature), the temperature of the resistive coil also increases until, at a preselected current value, the solder is caused to melt by the heated coil. When this occurs, an electrical circuit held mechanically by the solidified solder in the solder pot is opened to interrupt the flow of current. In the case of the control circuit illustrated in FIG. 3, a compressor valve 96 will be normally open and adapted to be closed when current is flowing through armature 92. When the valve is closed, no air is supplied to the inlet fitting 48. When the temperature of armature 42 increases beyond a preselected level, the thermal overload relay 94 is actuated as described above, opening the series circuit and causing the valve 96 to close. This results in the operation of the compressor, providing air to the motor as described above, and, consequently, resulting in cooling only at those times during which it is required.

The thermal overload relay 94 can be chosen to match a variety of different motors and operating conditions. In the preferred embodiment, the overload relay 94 should have a thermal time constant substantially identical to that of the motor so that it will reach its critical temperature (at which the solder melts) only at those times when the motor reaches a temperature where cooling is desired. Desirably, this should occur at a temperature slightly below that at which actual cooling is required so that whenever a dangerous temperature is reached, the overload relay will have been actuated to initiate cooling.

Although a preferred embodiment of the invention has been illustrated and described, the invention is not necessarily so limited, and those skilled in the art will be able to modify the principles of the invention for numerous related machines. For example, although the preferred embodiment has been designed for use as the servo driving means of a machine tool system, obviously, the principles of the invention may be used with motors which are intended for use in totally unrelated situations. In fact, the invention would have utility as the cooling means for all types of dynamoelectric machines (i.e. generators as well as motors) regardless of structural considerations relating to the stator and rotor. Moreover, the use of compressed air (e.g. at a pressure of approximately 10 p.s.i.) as a fluid coolant is suggested primarily from a viewpoint of expediency, and the invention is not limited to any specific coolant. It is contemplated that if the sealing rings 62 and 64 can be perfected for high-temperature operation, a liquid coolant or liquid disposed in air may be used in place of compressed air to further improve the cooling effect. Accordingly, the invention should be defined primarily with reference to the following claims.

We claim:

1. A motor, comprising:
   a stator including a plurality of permanent magnets disposed within a generally cylindrical casing;
   a rotor centrally disposed within said casing and including a central core member, axially displaced sleeves at opposite ends of said core member, and a winding about said core, said core member and sleeves including a plurality of circumferentially displaced longitudinal fluid transfer ducts therethrough for conducting a fluid coolant through the rotor;
   fluid inlet means disposed within said stator outside one of said sleeves and comprising an inlet duct and a circumferential passageway in a fluid conducting relationship with each of said fluid transfer ducts;
   fluid outlet means disposed outside the other of said sleeves and comprising an outlet duct and a circumferential passageway in fluid conducting relationship with each of said fluid transfer ducts;
   first sealing means comprising an annular seal between each of said sleeves and the adjacent portion of the stator for sealing the inlet and outlet circumferential passageways from the portion of the stator between said annular seals; and
   second sealing means for sealing said stator portion from its environment, whereby in the event of leakage of said first sealing means, air entering said inlet means tends to pass through said fluid transfer ducts to said outlet means.

2. A motor according to claim 1, further including at least two bearings for supporting said rotor, said bearings being positioned outside of said inlet and outlet circumferential passageways, respectively.

3. A servomotor according to claim 2, wherein said rotor includes a wound armature and further including means responsive to the current flow in said wound armature for coupling said fluid coolant to said fluid inlet means.

4. A servomotor according to claim 1, wherein said rotor includes a wound armature and further including means responsive to the current flow in said wound armature for coupling said fluid coolant to said fluid inlet means.

5. A servomotor according to claim 1, further including a commutator secured to one of said sleeves between said annular seals, and brush means cooperating with said commutator.